(12) United States Patent
Wang et al.

(10) Patent No.: US 12,231,046 B2
(45) Date of Patent: Feb. 18, 2025

(54) RADIO FREQUENCY SWITCH GENERATOR APPLICABLE TO 1.8 V AND 1.2 V POWER SUPPLIES

(71) Applicant: SHANGHAI CANAANTEK CO., LTD., Shanghai (CN)

(72) Inventors: Yujiao Wang, Shanghai (CN); Jianling Guan, Shanghai (CN); Tingting Xie, Shanghai (CN); Dehang Zhou, Shanghai (CN); Wenhai Ni, Shanghai (CN); Wenhua Xu Ni, Shanghai (CN)

(73) Assignee: SHANGHAI CANAANTEK CO., LTD., Shanghai (CN)

( * ) Notice: Subject to any disclaimer, the term of this patent is extended or adjusted under 35 U.S.C. 154(b) by 0 days.

(21) Appl. No.: 18/685,125

(22) PCT Filed: Nov. 29, 2023

(86) PCT No.: PCT/CN2023/134887
§ 371 (c)(1),
(2) Date: Feb. 20, 2024

(87) PCT Pub. No.: WO2024/120265
PCT Pub. Date: Jun. 13, 2024

(65) Prior Publication Data
US 2024/0266958 A1  Aug. 8, 2024

(30) Foreign Application Priority Data

Dec. 6, 2022 (CN) .......................... 202211554397.X (51) Int. Cl.
*H02M 3/158* (2006.01)
*G05F 1/46* (2006.01)
(Continued)

(52) U.S. Cl.
CPC ............ *H02M 3/158* (2013.01); *G05F 1/468* (2013.01); *G05F 3/265* (2013.01); *H02M 3/071* (2021.05)

(58) Field of Classification Search
CPC ...... H02M 3/158; H02M 3/071; H02M 3/073; G05F 1/468; G05F 3/265
See application file for complete search history.

(56) References Cited

U.S. PATENT DOCUMENTS 5,461,557 A   10/1995  Tamagawa
2005/0212547 A1* 9/2005  Suzuki ............... G01R 31/3008
                                                    324/750.3
(Continued)

FOREIGN PATENT DOCUMENTS

CN   104796171 B  *  9/2018
CN   113050507 A     6/2021
(Continued)

OTHER PUBLICATIONS

Machine English Translation for CN 104796171.*
Machine English Translation for CN 113794466.*

*Primary Examiner* — Thienvu V Tran
*Assistant Examiner* — Yahveh Comas Torres
(74) *Attorney, Agent, or Firm* — MUNCY, GEISSLER, OLDS & LOWE. P.C.

(57) ABSTRACT

A radio frequency switch generator applicable to 1.8 V and 1.2 V power supplies, which relates to the technical field of radio frequency switches. The present invention comprises a bandgap reference circuit, a linear voltage regulator circuit, a boost circuit, a ring oscillator circuit and a negative voltage circuit; wherein both the boost circuit and the ring oscillator circuit adopt an independent linear voltage stabilizing circuit as a power supply voltage source; square signals generated by the ring oscillator circuit are regarded as input signals of the boost circuit and the negative voltage circuit; and (Continued)

positive voltage is finally obtained after the boost circuit is subjected to double boosting twice, and negative voltage is finally obtained after the negative voltage circuit is subjected to three-level cascading.

7 Claims, 7 Drawing Sheets

(51) Int. Cl.
    *G05F 3/26*     (2006.01)
    *H02M 3/07*     (2006.01)

(56)     References Cited

U.S. PATENT DOCUMENTS

| | | | | |
|---|---|---|---|---|
| 2009/0108919 A1* | 4/2009 | Ogiwara | ............ | G05F 3/30 |
| | | | | 327/539 |
| 2012/0218032 A1* | 8/2012 | Nadimpalli | ............ | H02M 3/073 |
| | | | | 327/536 |
| 2016/0126835 A1* | 5/2016 | Englekirk | ............ | H02M 3/073 |
| | | | | 327/536 |

FOREIGN PATENT DOCUMENTS

| | | | |
|---|---|---|---|
| CN | 113794466 A | * | 12/2021 |
| CN | 217693081 U | | 10/2022 |
| CN | 115378411 A | | 11/2022 |
| CN | 116232301 A | | 6/2023 |
| JP | H08-307220 A | | 11/1996 |

\* cited by examiner

Prior Art

RADIO FREQUENCY SWITCH GENERATOR APPLICABLE TO 1.8 V AND 1.2 V POWER SUPPLIES

TECHNICAL FIELD

The present invention belongs to the technical field of radio frequency switches, in particular to a radio frequency switch generator applicable to 1.8 V and 1.2 V power supplies.

BACKGROUND ART

Figure 7:
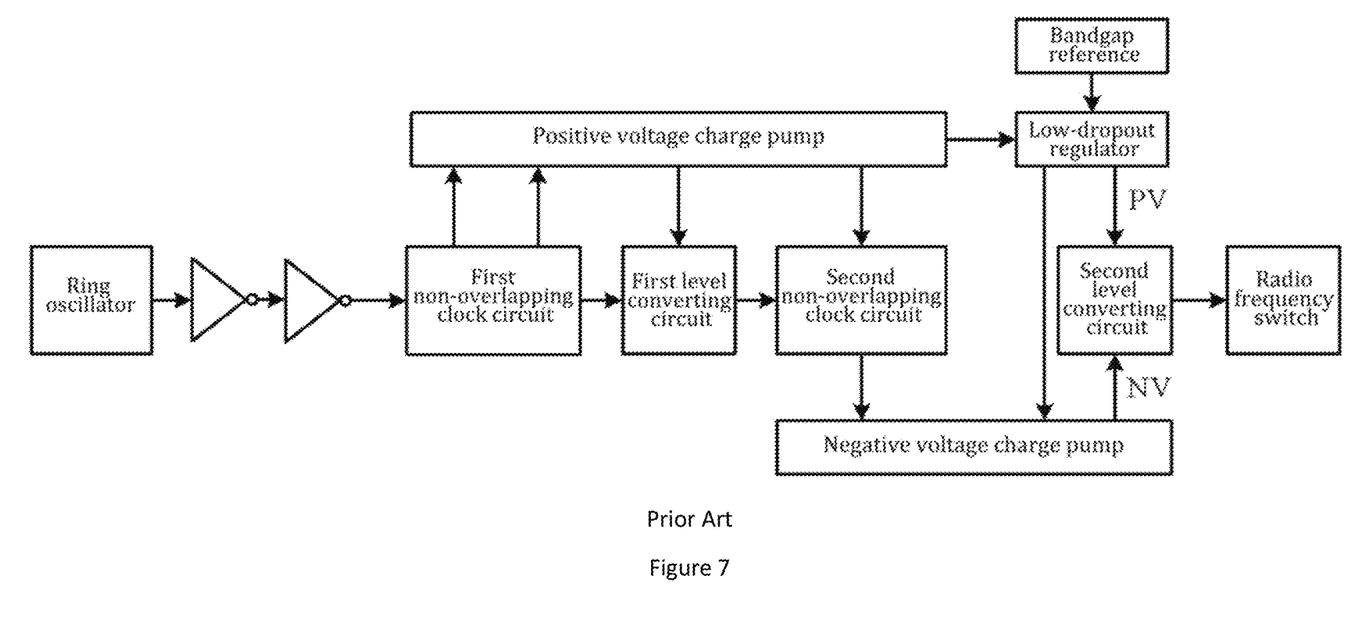
FIG. 7 is a block diagram of a radio frequency switch control circuit for a voltage source of 1.8 V in a published application.

In the field of radio frequency switches, a specific bias voltage is usually required to control the on and off of the switch, which usually comprises positive voltage (PV) and negative voltage (NV). In order to get better RF performance index, the ideal voltage values of PV and NV are between 2.5 V to 3 V/-2.5 V to -3 V. When the value of power supply voltage is greater than 3 V, positive voltage and negative voltage can be generated by linear voltage regulators and charge pumps, but when the value of power supply voltage is less than 3 V, such a simple solution will not be able to achieve PV/NV. As shown in FIG. 7, a block diagram of a radio frequency switch control circuit with a voltage source of 1.8 V applicable to a prior patent is shown, which comprises a ring oscillator circuit, an overlapping clock circuit, a low-dropout regulator and a negative voltage generation circuit, the positive voltage charge pump boosts the voltage source and the obtained voltage is used as the voltage source of the low dropout regulator, and meanwhile, the voltage source of the low-dropout regulator is increased from the original 1.8 V to 3.6 V, and the PV voltage (−2.5 V to 3 V) can be fixed after passing the linear voltage regulator, while NV can get voltage (−2.5 V to −3 V) from the negative voltage charge pump. However, the structure is only applicable to a voltage source of 1.8 V, and the power supply voltage commercially in need is even lower, currently reaching 1.2 V; and the structure cannot be regarded as a voltage generator for radio frequency switches. Therefore, the present invention proposes a voltage generator of the radio frequency switch for use in both 1.8 V and 1.2 V power supplies.

SUMMARY OF THE INVENTION

The present invention provides a radio frequency switch generator applicable to 1.8 V and 1.2 V power supplies, which solves the above problems.

In order to solve the above technical problems, the present invention is implemented by the following technical solutions:

a radio frequency switch generator applicable to 1.8 V and 1.2 V power supplies of the present invention comprises a bandgap reference circuit, a linear voltage regulator circuit, a boost circuit, a ring oscillator circuit and a negative voltage circuit; wherein both the boost circuit and the ring oscillator circuit adopt an independent linear voltage stabilizing circuit as a power supply voltage source; square signals generated by the ring oscillator circuit are regarded as input signals of the boost circuit and the negative voltage circuit; and positive voltage is finally obtained after the boost circuit is subjected to double boosting twice, and negative voltage is finally obtained after the negative voltage circuit is subjected to three-level cascading.

Further, an input voltage range of the power supply of the radio frequency switch generator is 1.1 V-2 V; based on the bandgap reference circuit within the voltage range, an output fixed voltage value is 0.79 V, and at this time, a fixed voltage of 1 V is generated after passing through a linear voltage regulator, a voltage source range of the linear voltage stabilizing circuit is 1.1 V-2 V, and the fixed linear voltage regulator is selected for outputting to ensure that power consumption of a whole system is relatively consistent within the variable voltage source range.

Further, the bandgap reference circuit comprises a first triode device, a second triode device, an operational amplifier circuit, a current mirror, a first resistor, a second resistor, a third resistor and a fourth resistor; the current mirror comprises a first common-source transistor, a second common-source transistor, a third common-source transistor that are respectively connected with the input voltage of the power supply, a first common-gate transistor connected with the first common-source transistor, a second common-gate transistor connected with the second common-source transistor, and a third common-gate transistor connected with the third common-source transistor; an output signal terminal of the operational amplifier circuit is connected between the first common-gate transistor and the second common-gate transistor; the second resistor is respectively connected in parallel to both terminals of a collector electrode and an emitter electrode of the second triode device, and the collector electrode is connected with a ground terminal, and the first resistor is connected to the emitter electrode of the second triode device; the fourth resistor is connected in parallel to both terminals of a collector electrode and an emitter electrode of the first triode device, and the collector electrode is connected to the ground terminal; a base electrode of the first triode device and a base electrode of the second triode device are connected and a lead wire is connected to the ground terminal; the first common-gate transistor, the collector electrode of the first triode device, the fourth resistor and a negative voltage terminal of the operational amplifier circuit are connected; the second common-gate transistor, the first resistor, the second resistor and a positive voltage terminal of the operational amplifier circuit are connected; one terminal of the third resistor is connected to the third common-gate transistor, and another terminal thereof is connected to the collector electrode of the second triode device and the second resistor, and is connected to the ground terminal; and reference voltage is connected between the third common-gate transistor and the third resistor.

Further, a proportional relationship between the first triode device and the second triode device is 1: N.

Further, the ring oscillator circuit comprises a first NOT gate, a second NOT gate, a third NOT gate and a transmission gate which are connected in sequence; and the transmission gate comprises a first MOSFET transistor and a second MOSFET transistor, an input terminal of the transmission gate is connected with an output terminal of the third NOT gate, and the output terminal is connected with an input terminal of the first NOT gate through wiring.

Further, the negative voltage circuit comprises three sets of negative voltage charge pumps;

wherein, a first set of the negative voltage charge pumps comprises a first switch, a second switch, a third switch and a fourth switch, wherein the first switch is connected with the third switch, the second switch is connected with the fourth switch, a first capacitor is connected between the first switch and the third switch and between the third switch and the fourth switch, a second capacitor is connected between the third switch and the fourth switch, and initial voltage is input from a first switch terminal;

a second set of the negative voltage charge pumps comprises a fifth switch, a sixth switch, a seventh switch and an eighth switch, wherein the fifth switch is connected with the seventh switch, the sixth switch is connected with the eighth switch, a third capacitor is connected between the fifth switch and the seventh switch and between the sixth switch and the eighth switch, a fourth capacitor is connected between the eighth switch and the seventh switch, and the fifth switch at a initiating terminal is connected with the second capacitor and the fourth switch; and a third set of the negative voltage charge pumps comprises a ninth switch, a tenth switch, an eleventh switch and a twelfth switch, wherein the ninth switch is connected with the eleventh switch, the tenth switch is connected with the twelfth switch, a fifth capacitor is connected between the ninth switch and the eleventh switch and between the tenth switch and the twelfth switch, a sixth capacitor is connected between the eleventh switch and the twelfth switch, the ninth switch at the initiating terminal is connected with the fourth capacitor and the eighth switch, and finally the sixth capacitor and the twelfth switch terminal are connected with negative voltage.

Further, the first switch and the second switch comprise switches controlled by first boost signals generated by the ring oscillator circuit; the third switch and the fourth switch comprise switches controlled by second boost signals; the fifth switch and the sixth switch comprise switches controlled by the first boost signals; the seventh switch and the eighth switch comprise switches controlled by the second boost signals; the ninth switch and the tenth switch comprise switches controlled by the first boost signals; the eleventh switch and the twelfth switch comprise switches controlled by the second boost signals; and the first boost signals and the second boost signals comprise reciprocal signals.

Further, initial input voltage is output voltage of the linear voltage regulator circuit; when switches of the first switch and the second switch are closed and switches of the third switch and the fourth switch are opened, charging of the first capacitor is the initial input voltage; when the switches of the first switch and the second switch are opened, and the switches of the third switch and the fourth switch are closed, the second capacitor is discharged, and voltage entering the fifth switch is negative equal the initial input voltage, similarly, voltage of the ninth switch is negative twice the initial input voltage, and the negative voltage thereof is negative three times the initial input voltage.

Further, the boost circuit comprises two sets of switching devices and six capacitors; wherein, a first set of the switching devices comprises a first MOS transistor switch, a second MOS transistor switch, a third MOS transistor switch and a fourth MOS transistor switch which are connected with each other, a seventh capacitor is connected between the first MOS transistor switch and the second MOS transistor switch, and an eighth capacitor is connected between the third MOS transistor switch and the fourth MOS transistor switch;

a second set of the switching devices comprises a fifth MOS transistor switch, a sixth MOS transistor switch, a seventh MOS transistor switch and an eighth MOS transistor switch which are adjacent to each other, wherein a ninth capacitor is connected between the fifth MOS transistor switch and the sixth MOS transistor switch, and a tenth capacitor is connected between the seventh MOS transistor switch and the eighth MOS transistor switch; and an eleventh capacitor is connected between the first set of the switching devices and the second set of the switching devices, a twelfth capacitor is connected between the sixth MOS transistor switch and the eighth MOS transistor switch, and a terminal of the twelfth capacitor is connected with the positive voltage.

Further, the initial voltage is connected between the first MOS transistor switch and the third MOS transistor switch, and first square signals generated by the ring oscillator circuit are respectively connected with the eighth capacitor and the tenth capacitor; second square signals generated by the ring oscillator circuit are respectively connected with the seventh capacitor and the ninth capacitor; and the first square signals and the second square signals are reciprocal signals.

Compared with the prior art, the present invention has the following beneficial effects:

(1) A voltage generator can be applied to radio frequency switches in both 1.8 V and 1.2 V power supplies;
(2) Based on the fixed voltage value of 0.79 V output by the reference circuit, a fixed voltage of 1 V is generated after passing through the linear regulator, and the voltage source of the linear regulator ranges from 1.1 V-2 V. The fixed output is selected to ensure that the power consumption of the whole system is relatively consistent within the variable voltage source range;
(3) The booster circuit, the ring oscillator circuit and the negative pressure circuit are all powered by separate linear voltage regulator circuits, so the isolation effect is good;
(4) the square signals generated by the ring oscillator circuit is used as the input signal of the booster circuit and the negative pressure circuit, and the booster circuit finally achieves positive pressure after twice boosting, and the negative pressure circuit finally achieves negative pressure through three-stage cascade;
(5) a constant voltage independent of temperature coefficient can be obtained by adjusting the second resistor/first resistor, and different reference voltage values can be obtained by adjusting the third resistor/second resistor; and in order to meet a wider range of power supply voltage, the output value of the reference voltage can be appropriately reduced, the smaller the output voltage, the wider the range of applicable low voltage power supplies, and the output value of the reference voltage designed in the present invention is 0.79 V.

It is not necessary for any product implementing the present invention to achieve all the advantages mentioned above at the same time.

BRIEF DESCRIPTION OF DRAWINGS

Hereinafter, in order to explain the technical solutions of embodiments of the present invention more clearly, drawings to describe the embodiments will be briefly introduced. Obviously, the drawings in the following description are only some embodiments of the present invention. For those of ordinary skill in the art, other drawings can also be obtained based on these drawings without creative work.

BGP-bandgap reference circuit; LDO-linear voltage stabilizing circuit; VBoost-boost circuit; OSC-ring oscillator circuit; CP-negative voltage circuit; PV-positive voltage; NV-negative voltage; VDD-input voltage of the power supply; Q1-first triode device; Q2-second triode device; OPA-operational amplifier circuit; R1-first resistor; R2-second resistor; R3-third resistor; R4-fourth resistor; M1-first common-source transistor; M2-second common-source transistor; M3-third common-source transistor; M4-fourth common-source transistor; M5-fifth common-source transistor; M6-sixth common-source transistor; GND-ground terminal; 1-first NOT gate; 2-second NOT gate; 3-third NOT gate; M7-first MOS transistor switch; M8-second MOS transistor switch; F-wiring; S1-first switch; S2-second switch; S3-third switch; S4-fourth switch; S5-fifth switch; S6-sixth switch; S7-seventh switch; S8-eighth switch; S9-ninth switch; S10-tenth switch; S11-eleventh switch; S12-twelfth switch; C1-first capacitor; C2-second capacitor; C3-third capacitor; C4-fourth capacitor; C5-fifth capacitor; C6-sixth capacitor; C7-seventh capacitor; C8-eighth capacitor; C9-ninth capacitor; C10-tenth capacitor; CA-eleventh capacitor; CB-twelfth capacitor; V1P0-initial voltage; CLK_B-first boost signal; CLK_B'-second boost signal; M11-first MOS transistor switch; M12-second MOS transistor switch; M13-third MOS transistor switch; M14-fourth MOS transistor switch; M15-fifth MOS transistor switch; M16-sixth MOS transistor switch; M17-seventh MOS transistor switch; M18-eighth MOS transistor switch; CLK_A-first square signal; CLK_A'-second square signal; and VREF-reference voltage.

Specific Embodiments

Hereinafter, the technical solutions in the embodiments of the present invention will be clearly and completely described below with reference to the accompanying drawings in the embodiments of the present invention. Obviously, the described embodiments are only some of the embodiments of the present invention, rather than all the embodiments. Based on the embodiments of the present invention, all other embodiments obtained by those of ordinary skill in the art without creative efforts fall within the scope of protection of the present invention.

As shown in FIG. 7, a block diagram of a radio frequency switch control circuit with a voltage source of 1.8 V applicable to a prior patent, which comprises a ring oscillator circuit, an overlapping clock circuit, a low-dropout regulator and a negative voltage generation circuit, a level converting circuit, a radio frequency switch and bandgap reference, wherein the positive voltage charge pump boosts the voltage source and the obtained voltage is used as the voltage source of the low dropout regulator, and meanwhile, the voltage source of the low-dropout regulator is increased from the original 1.8 V to 3.6 V, and the PV voltage (−2.5 V to 3 V) can be fixed after passing through the linear voltage regulator, while NV can get voltage (−2.5 V to −3 V) from the negative voltage charge pump. However, the structure is only applicable to a voltage source of 1.8 V, and the power supply voltage commercially in need is even lower, currently reaching 1.2 V; and the structure cannot be regarded as a voltage generator for radio frequency switches.

Referring to FIGS. 1-6, the radio frequency switch generator applicable to 1.8 V and 1.2 V power supplies according to the present invention, comprises a bandgap reference circuit (BGP), a linear voltage regulator circuit (LDO), a boost circuit (VBoost), a ring oscillator circuit (OSC) and a negative voltage circuit (CP); and in order to ensure a better isolation effect, both the boost circuit (VBoost) and the ring oscillator circuit (OSC) adopt an independent linear low-dropout circuit (LDO) as a power supply voltage source; square signals generated by the ring oscillator circuit (OSC) are regarded as input signals of the boost circuit (VBoost) and the negative voltage circuit (CP); and positive voltage (PV) is finally obtained after the boost circuit (VBoost) is subjected to double boosting twice, and negative voltage (NV) is finally obtained after the negative voltage circuit (CP) is subjected to three-level cascading. Wherein, an input voltage range of the power supply (VDD) of the radio frequency switch generator is 1.1 V-2 V; based on the bandgap reference circuit (BGP) within the voltage range, an output fixed voltage value is 0.79 V, and at this time, a fixed voltage of 1 V is generated after passing through a linear voltage regulator (LDO), a voltage source range of the linear voltage stabilizing circuit (LDO) is 1.1 V-2 V, and the fixed linear voltage regulator (LDO) is selected for outputting to ensure that power consumption of a whole system is relatively consistent within the variable voltage source range.

Figure 2:
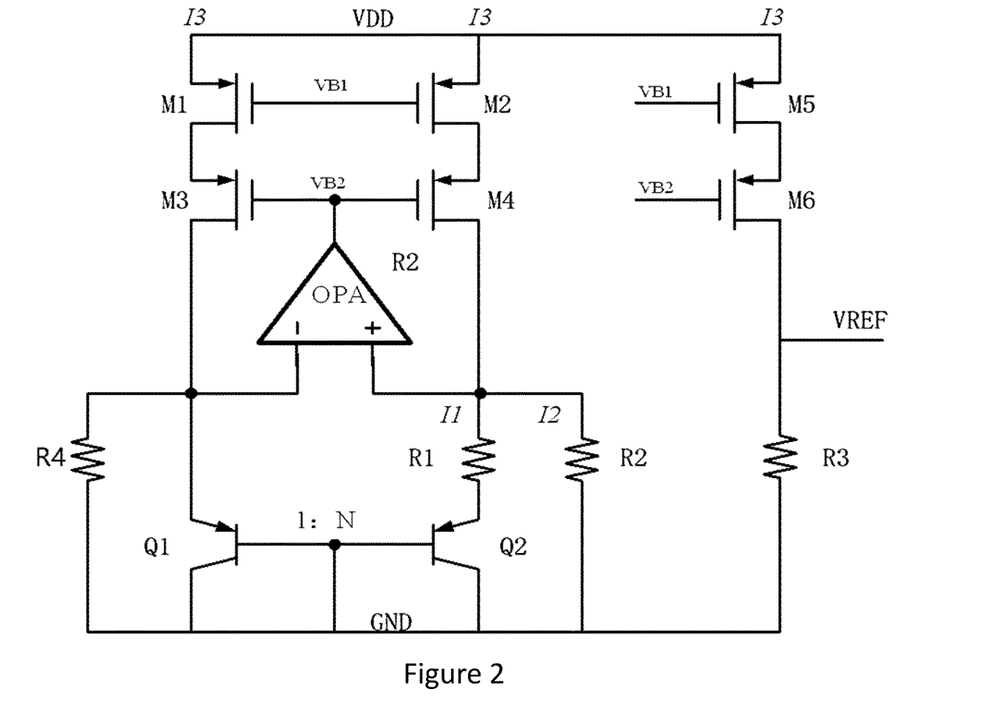
FIG. 2 is a structural diagram of a bandgap reference circuit of the present invention.

As shown in FIG. 2, the bandgap reference circuit (BGP) comprises a first triode device (Q1), a second triode device (Q2), an operational amplifier circuit (OPA), a current mirror, a first resistor (R1), a second resistor (R2), a third resistor (R3) and a fourth resistor (R4); the current mirror comprises a first common-source transistor (M1), a second common-source transistor (M2), a third common-source transistor (M5) that are respectively connected with the input voltage of the power supply (VDD), a first common-gate transistor (M3) connected with the first common-source transistor (M1), a second common-gate transistor (M4) connected with the second common-source transistor (M2), and a third common-gate transistor (M6) connected with the third common-source transistor (M5); an output signal terminal of the operational amplifier circuit (OPA) is connected between the first common-gate transistor (M3) and the second common-gate transistor (M4); the second resistor (R2) is respectively connected in parallel to both terminals of a collector electrode and an emitter electrode of the second triode device (Q2), and the collector electrode is connected with a ground terminal (GND), and the first resistor (R1) is connected to the emitter electrode of the second triode device (Q2); the fourth resistor (R4) is connected in parallel to both terminals of a collector electrode and an emitter electrode of the first triode device (Q1), and the collector electrode is connected to the ground terminal (GND); a base electrode of the first triode device (Q1) and a base electrode of the second triode device (Q2) are connected and a lead wire is connected to the ground terminal (GND); the first common-gate transistor (M3), the collector electrode of the first triode device (Q1), the fourth resistor (R4) and a negative voltage terminal of the operational amplifier circuit (OPA) are connected; the second common-gate transistor (M4), the first resistor (R1), the second resistor (R2) and a positive voltage terminal of the operational amplifier circuit (OPA) are connected; one terminal of the third resistor (R3) is connected to the third common-gate transistor (M6), and the other terminal thereof is connected to the collector electrode of the second triode device (Q2) and the second resistor (R2), and is connected to the ground terminal (GND); reference voltage (VREF) is connected between the third common-gate transistor (M6) and the third resistor (R3); a proportional relationship between the first triode device (Q1) and the second triode device (Q2) is 1: N; from the relationship of the corresponding positions, it can be seen that I1=VTInN/R1, I2=VBE/R2, I3=I1+I2, so VREF=R3/R2 [VBE+ (R2/R1) VTInN]; a constant voltage (VREF) independent of temperature coefficient can be obtained by adjusting the R2/R1, and different reference voltage (VREF) values can be obtained by adjusting the R3/R2. In order to meet a wider range of power supply voltage, the output value of the VREF can be appropriately reduced, the smaller the output voltage, the wider the range of applicable low voltage power supplies, and the output value of the reference voltage (VREF) designed by the present invention is 0.79 V.

Figure 3:
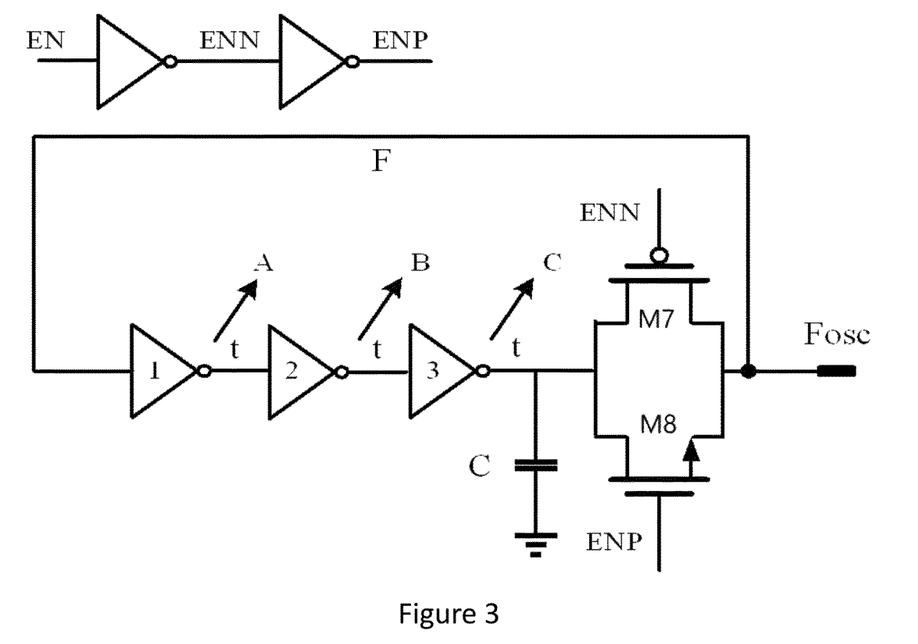
FIG. 3 shows a structure of a ring oscillator circuit of the present invention.

As shown in FIG. 3, the ring oscillator circuit (OSC) comprises a first NOT gate 1, a second NOT gate 2, a third NOT gate 3 and a transmission gate which are connected in sequence; wherein the transmission gate comprises a first MOSFET transistor (M7) and a second MOSFET transistor (M8), an input terminal of the transmission gate is connected with an output terminal of the third NOT gate 3, and the output terminal is connected with an input terminal of the first NOT gate 1 through wiring F.

The first MOSFET transistor (M7) and the second MOSFET transistor (M8) are combined into a transmission gate at a certain time TO.

Figure 4:
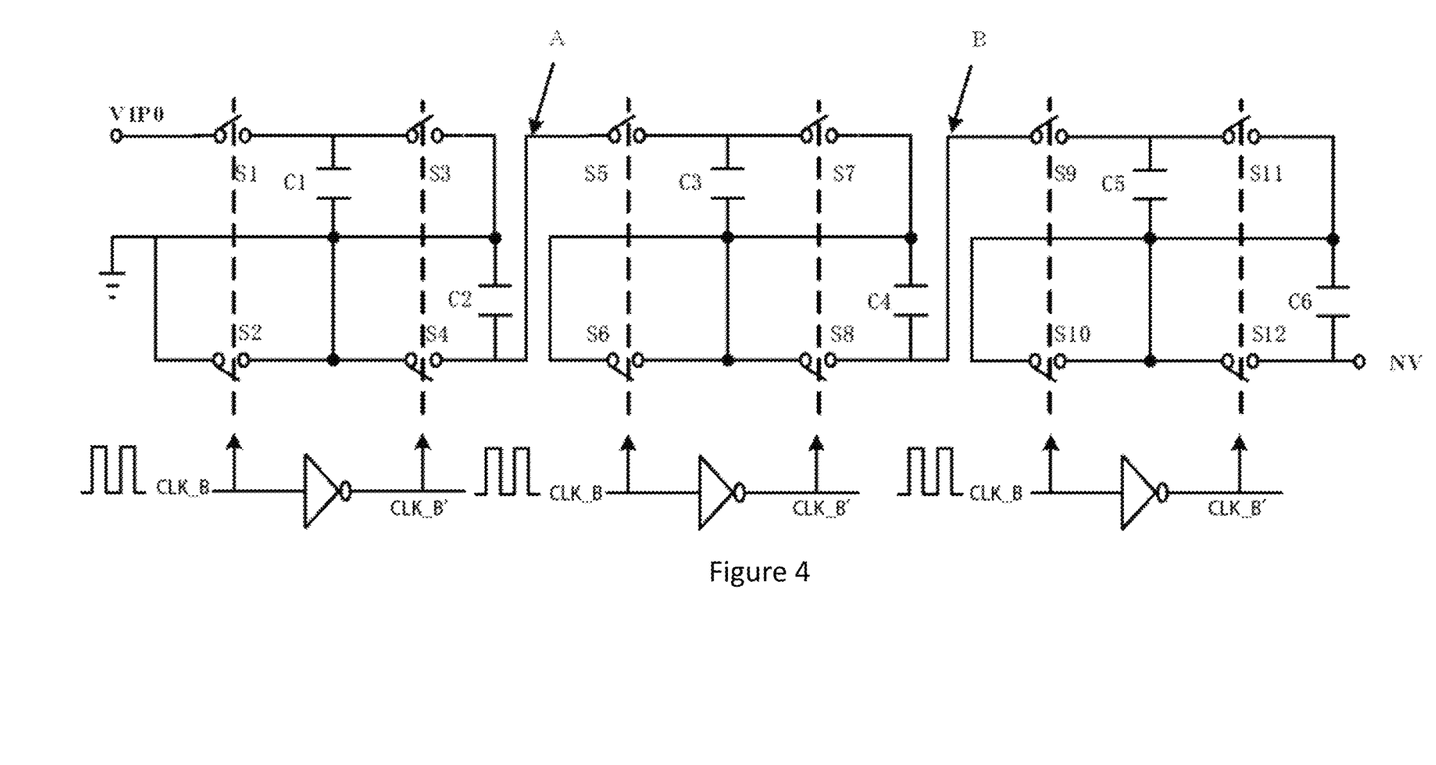
FIG. 4 is a structural diagram of negative voltage of the present invention.

Supposing that the transmission gate is turned on at a high level on the wiring F, for the first NOT gate 1, the NOT gate delay time is Δt (T=T0+Δt), the output of point A in FIG. 3 is at a low level; when passing the second NOT gate 2, the NOT gate delay time is Δt (T=T0+2Δt), and the output of point B in FIG. 3 is at a high level; when passing the third NOT gate 3, the NOT gate delay time is Δt (T=T0+3Δt), and the output of point B is at a low level, which is opposite to the level voltage at the time T0; after 6Δt, the input of the first NOT gate 1 changes back to the high level, thereby completing a period of oscillation, and then working repeatedly. Therefore, the frequency of the ring oscillator is f=1/2*t*n (wherein t represents the delay time of a single inverter, and n represents the number of the inverters), and changing C in the circuit diagram can also change the frequency of the oscillator;

As shown in FIG. 4, the negative voltage circuit (CP) comprises three sets of negative voltage charge pumps;

wherein, a first set of the negative voltage charge pumps comprises a first switch (S1), a second switch (S2), a third switch (S3) and a fourth switch (S4), wherein the first switch (S1) is connected with the third switch (S3), the second switch (S2) is connected with the fourth switch (S4), a first capacitor (C1) is connected between the first switch (S1) and the third switch (S3) and between the third switch (S3) and the fourth switch (S4), a second capacitor (C2) is connected between the third switch (S3) and the fourth switch (S4), and initial voltage (VIPO) is input from a first switch (S1) terminal;

a second set of the negative voltage charge pumps comprises a fifth switch (S5), a sixth switch (S6), a seventh switch (S7) and an eighth switch (S8), wherein the fifth switch (S5) is connected with the seventh switch (S7), the sixth switch (S6) is connected with the eighth switch (S8), a third capacitor (C3) is connected between the fifth switch (S5) and the seventh switch (S7) and between the sixth switch (S6) and the eighth switch (S8), a fourth capacitor (C4) is connected between the eighth switch (S8) and the seventh switch (S7), and the fifth switch (S5) at a initiating terminal is connected with the second capacitor (C2) and the fourth switch (S4); and a third set of the negative voltage charge pumps comprises a ninth switch (S9), a tenth switch (S10), an eleventh switch and a twelfth switch (S12), wherein the ninth switch (S9) is connected with the eleventh switch (S11), the tenth switch (S10) is connected with the twelfth switch (S12), a fifth capacitor (C5) is connected between the ninth switch (S9) and the eleventh switch (S11) and between the tenth switch (S10) and the twelfth switch (S12), a sixth capacitor (C6) is connected between the eleventh switch (S11) and the twelfth switch (S12), the ninth switch (S9) at the initiating terminal is connected with the fourth capacitor (C4) and the eighth switch (S8), and finally the sixth capacitor (C6) and the twelfth switch (S12) terminal are connected with negative voltage (NV).

Wherein, the first switch (S1) and the second switch (S2) comprise a set of switches controlled by first boost signals (CLK_B) generated by the ring oscillator circuit (OSC); the third switch (S3) and the fourth switch (S4) comprise a set of switches controlled by second boost signals (CLK_B'); the fifth switch (S5) and the sixth switch (S6) comprise a set of switches controlled by the first boost signals (CLK_B); the seventh switch (S7) and the eighth switch (S8) comprise a set of switches controlled by the second boost signals (CLK_B'); the ninth switch (S9) and the tenth switch (S10) comprise a set of switches controlled by the first boost signals (CLK_B); the eleventh switch (S11) and the twelfth switch (S12) comprise a set of switches controlled by the second boost signals (CLK_B'); and the first boost signals (CLK_B) and the second boost signals (CLK_B') are reciprocal signals; and when the initial voltage (V1P0) is input, the input voltage is the output voltage of the LDO which is 1 V, when the switches of S1 and S2 are closed and the switches of S3 and S4 are open, and C1 is charged to 1 V; when the switches of S1 and S2 are open and the switches of S3 and S4 are closed, C2 is discharged, and the output value at a point A is −1 V; and so on, the output value at point B is −2 V, and the output value at NV is −3 V.

Figure 5:
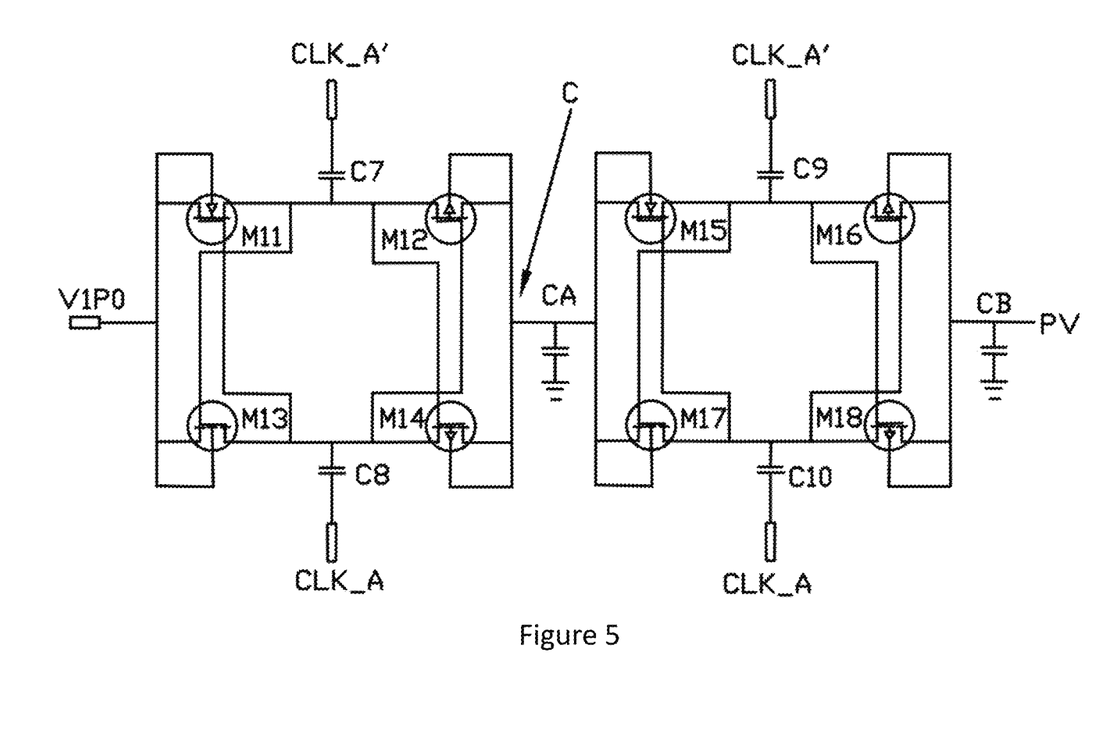
FIG. 5 is a structural diagram of a boost circuit of the present invention.

As shown in FIG. 5, the input initial voltage (V1P0) is output voltage of the linear voltage stabilizing circuit (LDO); when switches of the first switch (S1) and the second switch (S2) are closed and switches of the third switch (S3) and the fourth switch (S4) are opened, charging of the first capacitor (C1) is the input initial voltage (VIPO); when the switches of the first switch (S1) and the second switch (S2) are opened, and the switches of the third switch (S3) and the fourth switch (S4) are closed, the second capacitor (C2) is discharged, and voltage entering the fifth switch (S5) is negative equal the input initial voltage (VIPO), and so on, voltage of the ninth switch (S9) is negative twice the input initial voltage (VIPO), and the negative voltage (NV) is negative three times the input initial voltage (VIPO).

Wherein, the boost circuit (Vboost) comprises two sets of switching devices and six capacitors;

wherein, a first set of the switching devices comprises a first MOS transistor switch (M11), a second MOS transistor switch (M12), a third MOS transistor (M13) switch and a fourth MOS transistor switch (M14) which are connected with each other, a seventh capacitor (C7) is connected between the first MOS transistor switch (M11) and the second MOS transistor switch (M12), and an eighth capacitor (C8) is connected between the third MOS transistor switch (M13) and the fourth MOS transistor switch (M14);

a second set of the switching devices comprises a fifth MOS transistor switch (M15), a sixth MOS transistor switch (M16), a seventh MOS transistor switch (M17) and an eighth MOS transistor switch (M18) which are adjacent to each other, wherein a ninth capacitor (C9) is connected between the fifth MOS transistor switch (M15) and the sixth MOS transistor switch (M16), and a tenth capacitor (C6) is connected between the seventh MOS transistor switch (M17) and the eighth MOS transistor switch (M18); and an eleventh capacitor (CA) is connected between the first set of the switching devices and the second set of the switching devices, a twelfth capacitor (CB) is connected between the sixth MOS transistor switch (M16) and the eighth MOS transistor switch (M18), the twelfth capacitor terminal (CB) is connected with the positive voltage (PV), and the positive voltage (PV) is the output voltage.

Wherein, the initial voltage (VIPO) is connected between the first MOS transistor switch (M11) and the third MOS transistor switch (M13), and first square signals (CLK_A) generated by the ring oscillator circuit (OSC) are respectively connected with the eighth capacitor (C8) and the tenth capacitor (C10); and second square signals (CLK_A') generated by the ring oscillator circuit (OSC) are respectively connected with the seventh capacitor (C7) and the ninth capacitor (C9);

Wherein, the seventh capacitor (C7) and the eighth capacitor (C8) are a set of coupling capacitors, which generate alternating high and low levels to alternately control four MOS transistors of the first MOS transistor switch (M11), the second MOS transistor switch (M12), the third MOS transistor switch (M13), and the fourth MOS transistor switch (M14), at point C, the output voltage value reaches twice the input voltage value (V1P0), and the first square signals (CLK_A) and the second square signals (CLK_A') are reciprocal signals. Signals generated by the ring oscillator circuit (OSC) control the synchronous on-off states of the four transistors of the first MOS transistor switch (M11), the second MOS transistor switch (M12), the third MOS transistor switch (M13), and the fourth MOS transistor switch (M14), so that Vout=2*V1P0 is theoretically output, so the theoretical output value of point C is 2 V, and the theoretical value of the output voltage, namely the positive voltage (PV) is 4 V, while in practice, the efficiency cannot reach 100%. Considering the area and power of the layout, the efficiency is fixed at 90%, then if the two levels are cascaded, the final time output value of the positive voltage (PV) is 4 V*90% *90%=3.24 V.

Figure 6:
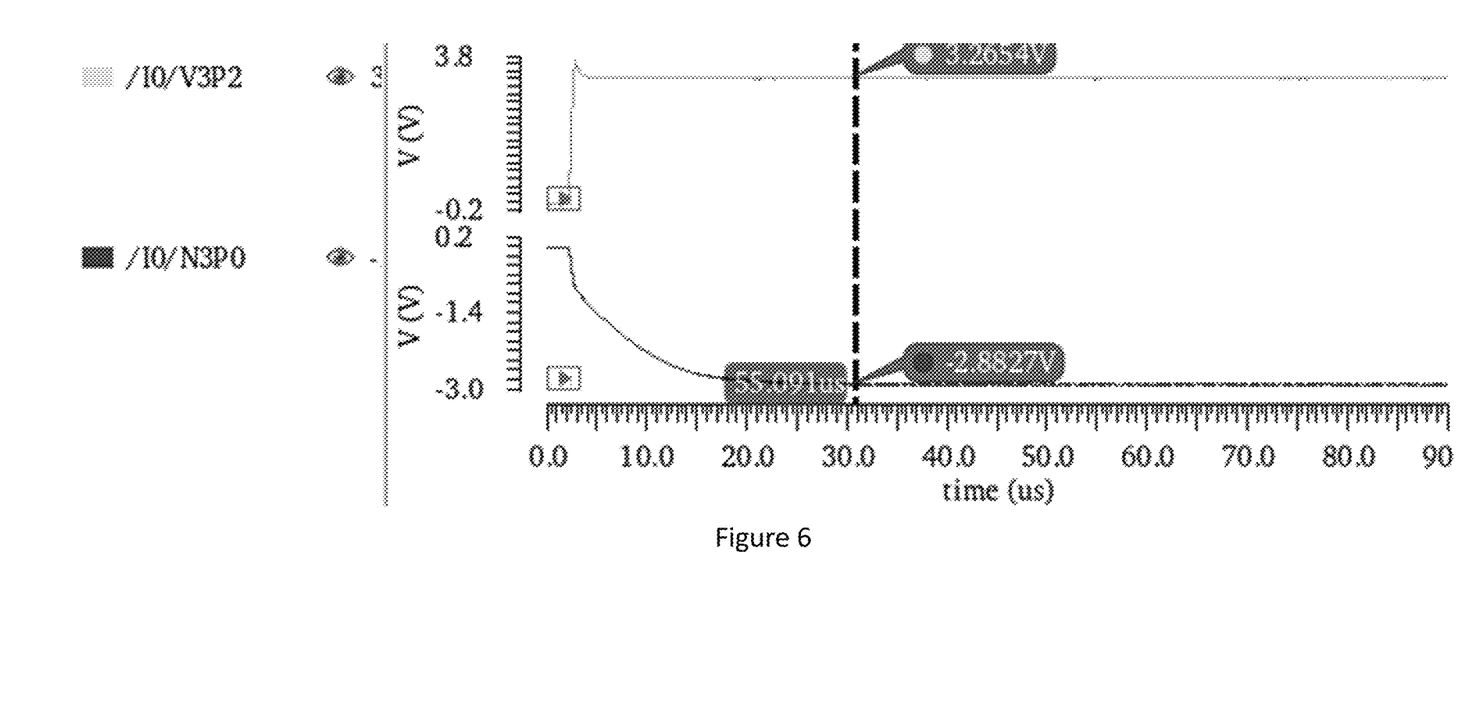
FIG. 6 is a PV/NV simulation waveform diagram finally realized by the present invention.

As shown in FIG. 6, a PV/NV simulation waveform diagram finally realized in the above specific embodiments, when the power supply voltage is 1.1 V, the final output of PVDD and NVDD is 3.2 V and −2.8 V respectively; the voltage is as shown in the simulation waveform, and the output of PV is 3.26 V; and the output value of NV is-2.88 V.

Therefore, technical solutions are summarized and specific implementation methods thereof are as follows:

1) Optimizing and Improving BGP (Reference)

(1) theoretical calculation:

$$I1 = Vbe/R2; I2 = \Delta Vbe/R1; I3 = 2(I1 + I2) = 2(Vbe/R2 + \Delta Vbe/R1)$$

$$Vref = I3*R3 = 2R3*(Vbe/R2 + \Delta Vbe/R1) = 2R3/R2*(Vbe + R2/R1*\Delta Vbe)$$

(2) by reasonable design of R3, R2 and R1, when the input voltage of the power supply (VDD) is 1.1 V-2 V, there will be a constant output of 0.79 V; and as the core power supply for other modules, the BGP can maintain a constant value when the power supply changes;

2) Optimizing and Improving Vboost (Boost)

(1) based on the design of BGP, in order to obtain a voltage output of 1 V, a linear regulator (LDO) is required;

(2) when VDD source input changes from 1.1 V to 2 V, it can output a voltage of VLDO=1 V, and a single-level Vboost can achieve 2VLDO output and 2 V;

(3) while the required PVDD for RF switches is 2.8 V-3.2 V, so a single-level Vboost cannot meet the design requirements; and (4) based on (2) that VLDO is used as an improved Vboost input, two-level cascading, output of 4 V can be theoretically obtained, while the efficiency of the voltage power generated by Vboost is not 100%, roughly 90%, so the final Vboost output value of the two-level cascading is 90% *90%*4 V=3.24 V;

3) Optimizing and Improving CP (Negative Voltage)

(1) based on fixed output of 1 V of LDO, the required value of the negative voltage by the RF switches is-3.2 V-2.8 V; and (2) the improved CP adopts the three-level cascade method and the theoretical principle of NVDD=0-VLDO-VLDO-VLDO=−3 V;

4) Optimizing and Improving OSC (Ring Oscillator)

Figure 1:
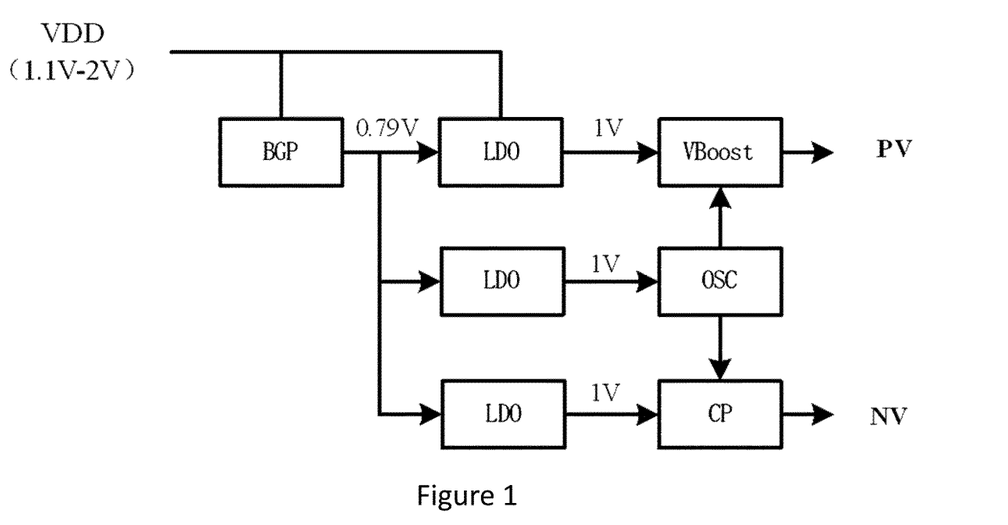
FIG. 1 is a block diagram of implementation of a control circuit applicable to a low-voltage radio frequency switch of that present invention.

(1) f=1/2*t*n (wherein t represents the delay time of a single inverter, n represents the number of inverters); and (2) based on the fixed output of 1V of LDO, OSC can obtain the frequency required to be designed;

5) Relationship Between BGP/LDO/Vboost/CP/OSC as shown in FIG. 1, BGP, as a core module of the whole system, can output a constant voltage of 0.79 V when the VDD voltage changes from 1.1 V to 2 V; based on BGP, LDO acts as a linear voltage regulator, whose source is also provided by VDD, so even the VDD power supply changes from 1.1 V to 2 V, constant 1 V can also be output; the sources of OSC, Vboost and CP are each equipped with an LDO, and the output of the LDO is taken as the input source of the three module circuits, when the input source is stable, the output of the three modules are fixed; Vboost not only requires the output of LDO as input, but also requires the output of OSC as input, which is well known in the discipline. Similarly, CP not only requires the output of LDO as input, but also requires the output of OSC as input, which is well known in the art; and implementation based on the underlying modules has specified the design requirements of PVDD and NVDD, and the whole solution process is obvious.

The differences between the technical solution and prior methods:
1) existing BGP (reference), wherein when the power supply is 1.1 V, the circuit works abnormally, and the functions and performance are abnormal;
2) existing Vboost (boost), wherein when the power supply voltage is 1.1 V, Vboost outputs voltage based on LDO, even if LDO works normally, it outputs a voltage value of 1.1 V; the output of Vboost is only 2.2 V, which cannot meet the bias voltage value required for turning on the RF switch;
3) existing CP (negative voltage), which is the same as that of 2), wherein when the power supply voltage is 1.1 V, even if the LDO works normally, the output of LDO is taken as the input of CP, and the output value of the two-level cascaded CP is-2.2 V, which cannot meet the bias voltage value required for turning off the RF switch; and
4) existing OSC (ring oscillator), wherein the existing structure of the ring oscillator cannot meet the voltage margin when the voltage is 1.1 V; with Vth of 0.7 V as the critical point, the existing structure as shown in the figures requires at least 2*Vth=1.4 V to ensure that the circuit works normally, so the structure is limited by the size of the voltage source.

5) Relationships Between BGP/LDO/Vboost/CP/OSC

Figure 8:
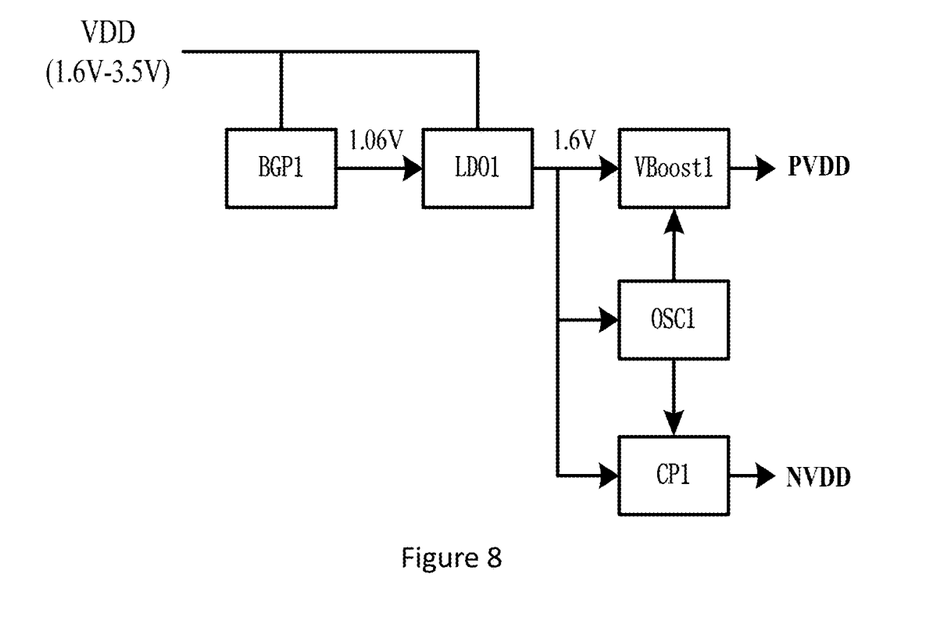
FIG. 8 is a system block diagram of a conventional voltage source applicable to a radio frequency bias voltage generator; and in the drawings, the list of components represented by each reference number is as follows.

As shown in FIG. 8, BGP serves as the core module of power supply in the whole system; when the power supply voltage is 1.1 V, the core module is limited whose functions are abnormally; therefore, the solution cannot realize PVDD and NVDD; and meanwhile, Vboost, CP, and OSC will all be affected in linkage.

The preferred embodiments of the present invention disclosed above are only intended to assist in illustrating the present invention. The preferred embodiments do not describe all in detail, nor are they limited to the specific embodiments described. It is obvious that many modifications and variations are possible in light of the contents of the specification. The embodiments are selected and described in detail in the specification to better explain the principles and practical applications of the present invention, so that those skilled in the art can better understand and utilize the present invention. The present invention is limited only by the claims and full scope and equivalents thereof.

The invention claimed is:

1. A radio frequency switch generator applicable to 1.8 V and 1.2 V power supplies comprises a bandgap reference circuit, a linear voltage regulator circuit, a boost circuit, a ring oscillator circuit and a negative voltage circuit;
wherein both the boost circuit and the ring oscillator circuit adopt an independent linear voltage stabilizing circuit as a power supply voltage source; square signals generated by the ring oscillator circuit are used as input signals of the boost circuit and the negative voltage circuit; and positive voltage is finally obtained after the boost circuit is subjected to double boosting twice, and negative voltage is finally obtained after the negative voltage circuit is subjected to three-level cascading;
wherein the bandgap reference circuit comprises a first triode device, a second triode device, an operational amplifier circuit, a current mirror, a first resistor, a second resistor, a third resistor and a fourth resistor; the current mirror comprises a first common-source transistor, a second common-source transistor, a third common-source transistor that are respectively connected with the input voltage of the power supply, a first common-gate transistor connected with the first common-source transistor, a second common-gate transistor connected with the second common-source transistor, and a third common-gate transistor connected with the third common-source transistor; an output signal terminal of the operational amplifier circuit is connected in between the first common-gate transistor and the second common-gate transistor; the second resistor is respectively connected in parallel to both terminals of a collector electrode and an emitter electrode of the second triode device, and the collector electrode is connected with a ground terminal, and the first resistor is connected to the emitter electrode of the second triode device; the fourth resistor is connected in parallel to both terminals of a collector electrode and an emitter electrode of the first triode device, and the collector electrode is connected to the ground terminal; a base electrode of the first triode device and a base electrode of the second triode device are connected and a lead wire is connected to the ground terminal; the first common-gate transistor, the collector electrode of the first triode device, the fourth resistor and a negative voltage terminal of the operational amplifier circuit are connected; the second common-gate transistor, the first resistor, the second resistor and a positive voltage terminal of the operational amplifier circuit are connected; one terminal of the third resistor is connected to the third common-gate transistor, and another terminal thereof is connected to the collector electrode of the second triode device and the second resistor, and is connected to the ground terminal; and
reference voltage is connected between the third common-gate transistor and the third resistor.

2. The radio frequency switch generator applicable to 1.8 V and 1.2 V power supplies according to claim 1, wherein a proportional relationship between the first triode device and the second triode device is 1: N.

3. The radio frequency switch generator applicable to 1.8 V and 1.2 V power supplies according to claim 1, wherein the negative voltage circuit comprises three sets of negative voltage charge pumps;
wherein, a first set of the negative voltage charge pumps comprises a first switch, a second switch, a third switch and a fourth switch, wherein the first switch is connected with the third switch, the second switch is connected with the fourth switch, a first capacitor is connected between the first switch and the third switch and between the third switch and the fourth switch, a second capacitor is connected between the third switch and the fourth switch, and initial voltage is input from a first switch terminal;
a second set of the negative voltage charge pumps comprises a fifth switch, a sixth switch, a seventh switch and an eighth switch, wherein the fifth switch is connected with the seventh switch, the sixth switch is connected with the eighth switch, a third capacitor is connected in between the fifth switch and the seventh switch and between the sixth switch and the eighth switch, a fourth capacitor is connected in between the eighth switch and the seventh switch, and the fifth switch at a initiating terminal is connected with the second capacitor and the fourth switch; and
a third set of the negative voltage charge pumps comprises a ninth switch, a tenth switch, an eleventh switch and a twelfth switch, wherein the ninth switch is connected with the eleventh switch, the tenth switch is connected with the twelfth switch, a fifth capacitor is connected between the ninth switch and the eleventh switch and between the tenth switch and the twelfth switch, a sixth capacitor is connected between the eleventh switch and the twelfth switch, the ninth switch at the initiating terminal is connected with the fourth capacitor and the eighth switch, and finally the sixth capacitor and the twelfth switch terminal are connected with negative voltage.

4. The radio frequency switch generator applicable to 1.8 V and 1.2 V power supplies according to claim 3, wherein the first switch and the second switch comprise a set of switches controlled by first boost signals generated by the ring oscillator circuit; the third switch and the fourth switch comprise a set of switches controlled by second boost signals; the fifth switch and the sixth switch comprise a set of switches controlled by the first boost signals; the seventh switch and the eighth switch comprise a set of switches controlled by the second boost signals; the ninth switch and the tenth switch comprise a set of switches controlled by the first boost signals; the eleventh switch and the twelfth switch comprise a set of switches controlled by the second boost signals; and the first boost signals and the second boost signals are reciprocal signals.

5. The radio frequency switch generator applicable to 1.8 V and 1.2 V power supplies according to claim 3, wherein an input initial voltage is output voltage of the linear voltage regulator circuit; when switches of the first switch and the second switch are closed and switches of the third switch and the fourth switch are opened, charging of the first capacitor is the input initial voltage; when the switches of the first switch and the second switch are opened, and the switches of the third switch and the fourth switch are closed, the second capacitor is discharged, and voltage entering the fifth switch is negative equal the input initial voltage, similarly, voltage of the ninth switch is negative twice the input initial voltage, and the negative voltage is negative three times the input initial voltage.

6. The radio frequency switch generator applicable to 1.8 V and 1.2 V power supplies according to claim 1, wherein the boost circuit comprises two sets of switching devices and six capacitors;

wherein, a first set of the switching devices comprises a first MOS transistor switch, a second MOS transistor switch, a third MOS transistor switch and a fourth MOS transistor switch which are connected together, a seventh capacitor is connected between the first MOS transistor switch and the second MOS transistor switch, and an eighth capacitor is connected between the third MOS transistor switch and the fourth MOS transistor switch;

a second set of the switching devices comprises a fifth MOS transistor switch, a sixth MOS transistor switch, a seventh MOS transistor switch and an eighth MOS transistor switch which are adjacent, wherein a ninth capacitor is connected between the fifth MOS transistor switch and the sixth MOS transistor switch, and a tenth capacitor is connected between the seventh MOS transistor switch and the eighth MOS transistor switch; and an eleventh capacitor is connected between the first set of the switching devices and the second set of the switching devices, a twelfth capacitor is connected in between the sixth MOS transistor switch and the eighth MOS transistor switch, and a terminal of the twelfth capacitor is connected with the positive voltage.

7. The radio frequency switch generator applicable to 1.8 V and 1.2 V power supplies according to claim 6, wherein initial voltage is input in between the first MOS transistor switch and the third MOS transistor switch, and first square signals generated by the ring oscillator circuit are respectively connected with the eighth capacitor and the tenth capacitor; second square signals generated by the ring oscillator circuit are respectively connected with the seventh capacitor and the ninth capacitor; and the first square signals and the second square signals are reciprocal signals.

* * * * *